United States Patent [19]

Barnes

[11] 3,801,970

[45] Apr. 2, 1974

[54] SIGNAL TRANSLATING CIRCUIT AND METHODS FOR HANDLING UNIDIRECTIONAL INPUT SIGNALS

[75] Inventor: Alan G. Barnes, Hounslow, England

[73] Assignee: Wilkinson Sword Limited, London, England

[22] Filed: Feb. 25, 1972

[21] Appl. No.: 229,353

[30] Foreign Application Priority Data

Mar. 19, 1971 Great Britain .................... 7419/71

[52] U.S. Cl. ............ 340/228 R, 340/216, 340/207, 332/16, 325/113, 325/145, 307/240

[51] Int. Cl. .................... G08b 21/00, G01r 13/04

[58] Field of Search .......... 340/228, 216, 207, 209, 340/227; 332/17, 22, 16, 66, 18, 19; 325/113, 145, 159; 330/10; 332/66, 18, 19; 324/118; 307/240, 251

[56] References Cited

UNITED STATES PATENTS

| | | | |
|---|---|---|---|
| 3,483,476 | 12/1969 | Kobayashi et al. | 330/10 |
| 3,387,296 | 6/1968 | Epstein et al. | 340/207 R |
| 2,923,887 | 2/1960 | Aiken | 330/10 |
| 3,130,373 | 4/1964 | Braymer | 330/10 |
| 3,524,180 | 8/1970 | Crose | 340/228 X |
| 3,005,964 | 10/1961 | Gordon | 340/207 R X |

*Primary Examiner*—John W. Caldwell
*Assistant Examiner*—William M. Wannisky
*Attorney, Agent, or Firm*—Wolfe, Hubbard, Leydig, Voit & Osann, Ltd.

[57] ABSTRACT

The unidirectional output voltage from a thermocouple is chopped to produce a corresponding alternating signal which is then amplified and fed to a frequency modulator. The latter produces an output signal whose frequency is dependent on the magnitude of the alternating signal from the chopper, and this output frequency is superimposed on power supply lines for transmission to a distant point. In addition, the output frequency from the frequency modulator is used to drive the signal chopper so as to maintain the alternating signal from the chopper continuously in phase with the operation of the frequency modulator.

9 Claims, 4 Drawing Figures

SIGNAL TRANSLATING CIRCUIT AND METHODS FOR HANDLING UNIDIRECTIONAL INPUT SIGNALS

The invention relates to electrical circuit arrangements for producing an electrical output whose frequency is dependent on the magnitude of an electrical input signal, and more particularly, though not exclusively, to electrical circuit arrangements for producing an electrical output whose frequency is dependent on the magnitude of the temperature-dependent signal from a thermocouple.

According to the invention, there is provided an electrical circuit arrangement responsive to the output voltage of a thermocouple, comprising signal converting means operative to convert the thermocouple voltage into an alternating signal having a corresponding amplitude, and frequency modulating means responsive to the alternating signal to produce an output frequency whose value is dependent on the magnitude of the alternating signal.

According to the invention, there is also provided an electrical circuit arrangement responsive to a unidirectional electrical input signal, comprising signal converting means for receiving the unidirectional input signal and converting it into an alternating signal of corresponding amplitude, frequency modulating means connected to receive the alternating signal and to produce an output signal whose frequency is dependent on the magnitude of the alternating signal, and means responsive to the said output frequency for driving the signal converting means.

According to the invention, there is further provided an electrical circuit arrangement responsive to the temperature dependent electrical output of a thermocouple, comprising signal chopping means for receiving the thermocouple output and for converting it into an alternating signal having a corresponding magnitude, frequency modulating means responsive to the alternating signal and operative to produce an output frequency dependent on the magnitude of the alternating signal, and means responsive to the output frequency to drive the chopping means at a corresponding frequency.

According to the invention, there is still further provided a method of transmitting a unidirectional electrical signal, in which the unidirectional signal is converted into an alternating signal of corresponding amplitude, which is then used to produce a frequency modulation dependent on the alternating signal amplitude, and the frequency modulation is then superimposed on power supply lines.

An electrical circuit arrangement embodying the invention will now be described by way of example only and with reference to the accompanying drawings in which.

Figure 1:
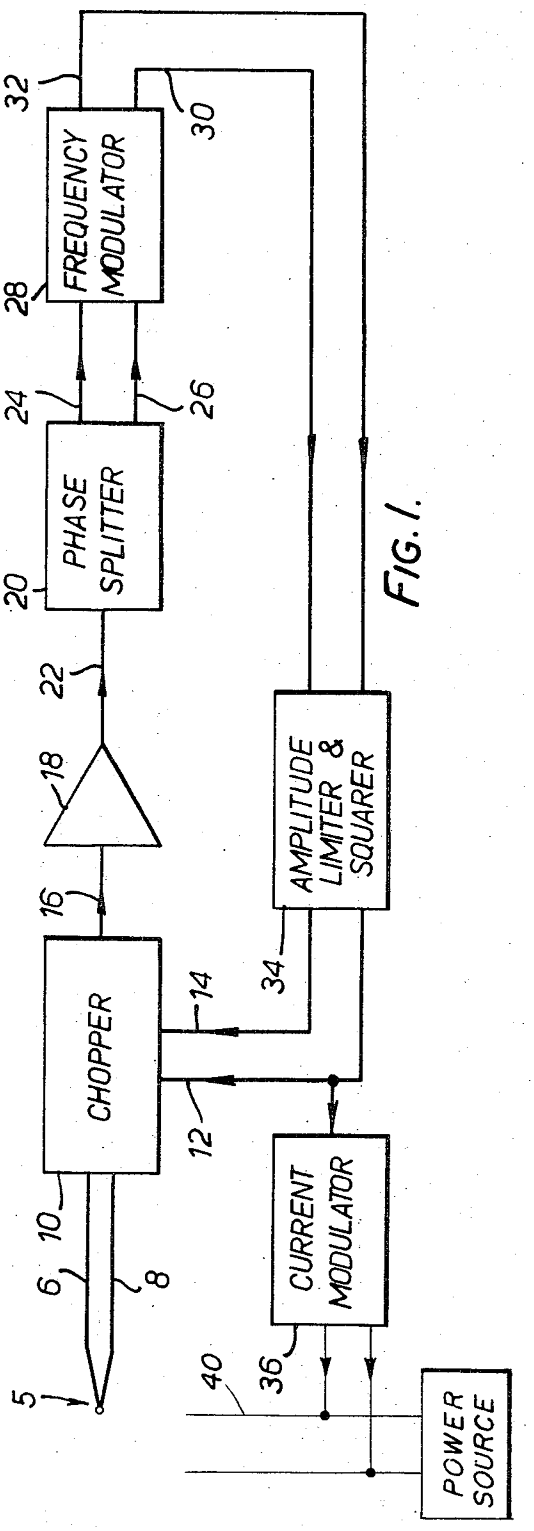
FIG. 1 is a block circuit diagram of the arrangement.

The circuit arrangement (FIG. 1) comprises a thermocouple 5 which responds to a temperature to be measured and produces a corresponding d.c. output signal which is fed via the legs 6 and 8 of the thermocouple to a chopper circuit 10. The chopper circuit operates under control of gating signals presented on lines 12 and 14, and chops the thermocouple signal so as to produce therefrom an alternating signal on a line 16 whose amplitude is dependent on the d.c. thermocouple signal. The chopper circuit 10 incorporates means to be described for compensating for the effect of changes in ambient temperature on the cold junction of the thermocouple.

The alternating output on the line 16 is amplified by an a.c. amplifier 18 and fed to a phase splitter 20 on a line 22. The phase spitter 20 splits the amplified a.c. signal into complementary positive and negative portions which are presented on lines 24 and 26 to a frequency modulator 28.

The frequency modulator 28 produces complementary signals on lines 30 and 32 whose frequency is related to the amplitude of the a.c. signals presented on the lines 24 and 26. The frequency-modulated signals on lines 30 and 32 are fed to an amplitude limiter and squarer 34 where they are converted into square waves which are produced on the lines 12 and 14. The square wave signal on the line 12 controls a current modulator 36, which is connected to the main power supply line 40 feeding the units of the arrangement (the connections from the power supply line 40 to the units being omitted for clarity) and thus modulates the power supply on line 40 at a frequency dependent on the temperature sensed by the thermocouple 5.

It will be seen that the frequency modulated output signals on the lines 12 and 14 are used as the gating pulses for th chopper 10. This avoids the necessity of providing a separate chopping frequency source and enables the chopped signals to be applied to the frequency modulator (without prior conversion back to a d.c. level) since their frequency is in phase with the operation of the frequency modulator.

Figure 2:
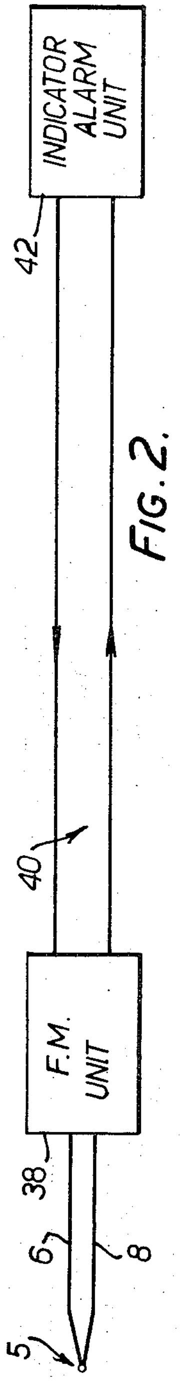
FIG. 2 is a block diagram of a temperature measuring system including the arrangement of FIG. 1.

FIG. 2 shows how the circuit arrangement of FIG. 1 may be used in a temperature indicating and alarm system. As shown in FIG. 2, the thermocouple 5 is positioned in the region whose temperature is to be measured and connected by its leads 6 and 8 to the circuitry of FIG. 1 which is represented by the block 38. The block 38 is supplied with a d.c. power supply by means of a two-core cable 40. As described with reference to FIG. 1, the current modulator 36 imposes a frequency modulation on the d.c. power transmitted along the cable 40, the frequency of this modulation being dependent on the temperature sensed by the thermocouple. At the other end of the cable 40, an indicating and alarm unit 42 is positioned which is arranged to sense the frequency of the modulation on the cable 40, and thus the temperature of the thermocouple 5.

Thus, only a two-core cable for the unit 38 is required, this cable carrying both the d.c. power and the temperature-representing output signal. Since the latter is transmitted in terms of frequency, it will be comparatively unaffected by noise or other extraneous effects, and by attenuation in the cable. The leads 6 and 8 of the thermocouple 5 need only be sufficiently long to ensure that the units of the block 38 operate within their normal temperature range and the expense of long compensating leads to transmit the thermocouple output over a long distance to an indicator and alarm unit is thus avoided. The arrangement described is therefore of particular advantage where temperature at a remote point is to be monitored.

The unit 42 can incorporate alarm means for giving an alarm if the temperature rises or falls to a predetermined level.

Figure 3A:
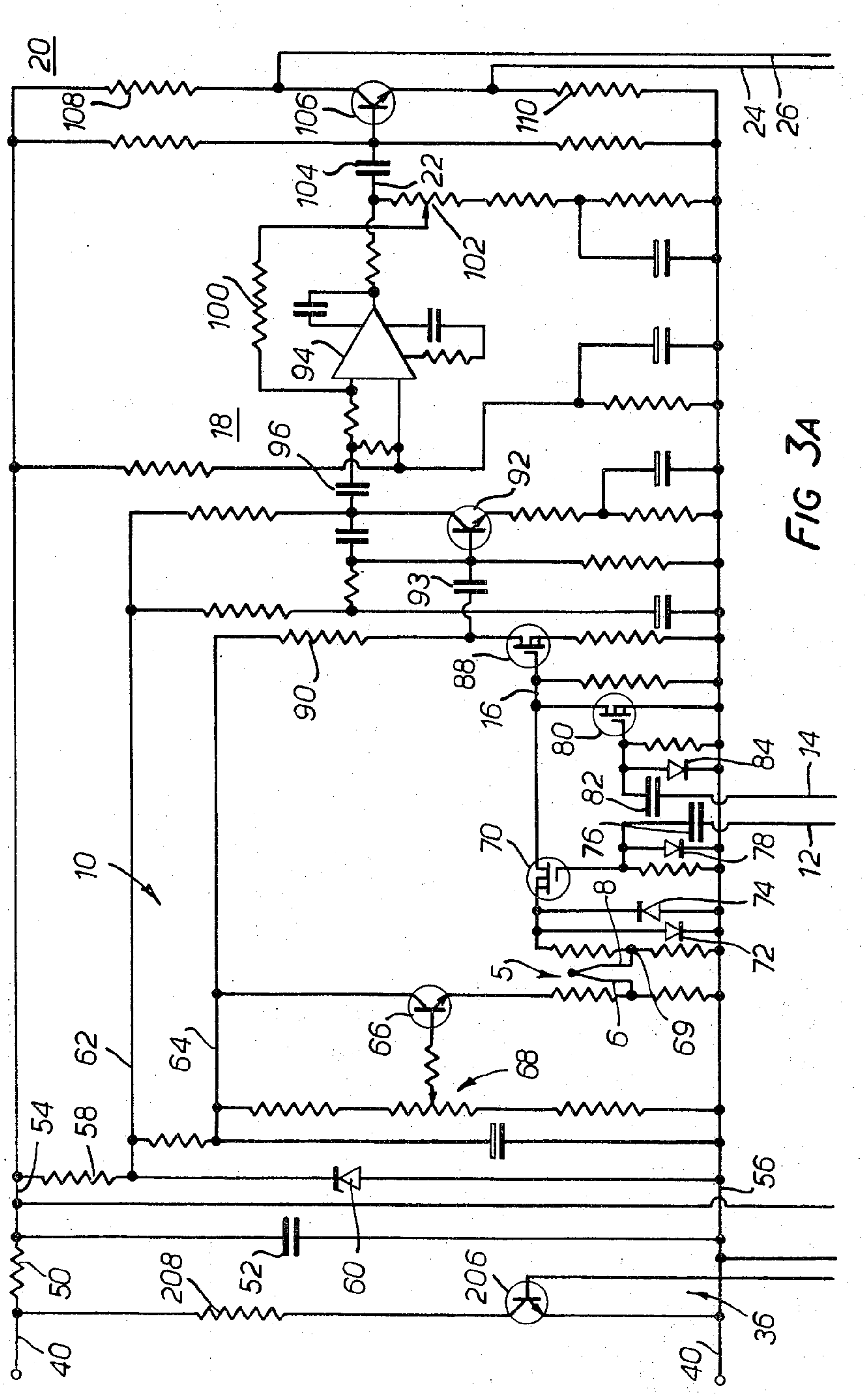
FIG. 3 is a schematic circuit diagram of the arrangement of FIG. 1.
Figure 3B:
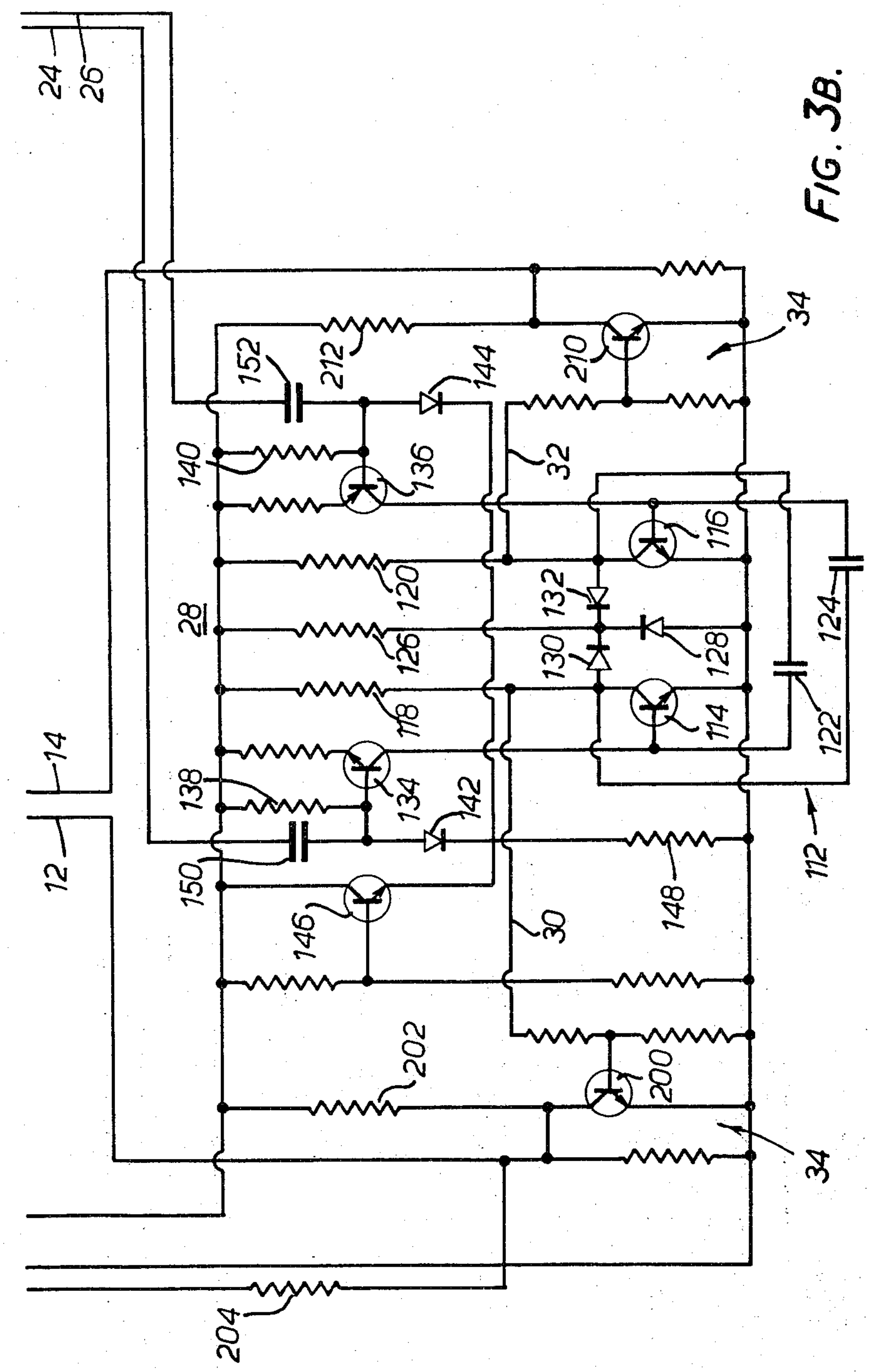

The circuitry of the block 38 will now be described in more detail with reference to FIG. 3, in which items corresponding to items in FIGS. 1 and 2 are similarly referenced.

The circuitry receives d.c. power from the cable 40 via a resistor 50 and a capacitor 52 which substantially remove any modulation on the cable 40 and provide a d.c. voltage between a positive line 54 and a negative line 56. A zener diode 60 produces a stabilised voltage on a line 62 from which a decoupled line 64 is derived.

The line 64 supplies the cold junction compensated chopper circuit 10. This comprises a transistor 66 whose base is connected to the line 64 via a potential dividing resistor chain 68. Transistor 66 produces a small d.c. voltage which is connected in series with the legs 6 and 8 of the thermocouple 5. The resultant sum voltage at a point 69 (the sum of the d.c. voltage produced by the transistor 66 and the d.c. voltage produced by the thermocouple) is applied to a series-connected field effect transistor (FET) 70. Diodes 72 and 74 protect the FET against dangerously high signals. The gate electrode of the FET 70 is connected to the line 12 (see FIG. 1) via a capacitor 76, and a diode 78 provides a d.c. restoration.

The chopper circuit 10 also includes a shunt FET 80 which is connected across the output of the FET 70 and has its gate electrode connected to the line 14 (see FIG. 1) via a capacitor 82, and a diode 84 also provides d.c. restoration.

In operation, the complementary square wave outputs on the lines 12 and 14 cause the FET's 70 and 80 to chop the summed d.c. output at the junction point 69. More particularly, the signals on the lines 12 and 14 cause FET 70 to be conductive when FET 80 is non-conductive and vice versa.

The transistor 66 is positioned so as to be at the same ambient temperature as the cold junction of the thermocouple 5 and arranged so that changes in the ambient temperature which reduce the thermocouple output voltage are compensated for by an increase in the output voltage produced by the transistor, and vice versa. The voltage at the point 69 thus represents the temperature at the hot junction of the thermocouple.

The chopped d.c. output is presented to the amplifier 18 on the line 16. The line 16 is connected to the gate electrode of a further FET 88 which is supplied with a stabilised voltage from the line 64 through a load resistor 90. The output from the FET 88 is fed to the base of a transistor 92 via a coupling capacitor 93. The amplified output from the transistor 92 is applied to one input of an operational amplifier 94 via a further coupling capacitor 96, and the second input of the amplifier 94 is fed with a potential derived from the line 54. The amplifier 94 has a feedback resistor 100 in series with a tapped-off portion of an adjustable resistor 102, the latter controlling the amplification of the amplifying unit 18.

The amplified output from the amplifying unit 18 is fed via a coupling capacitor 104 to the phase splitter 20 which comprises a transistor 106 having a collector load resistor 108 and an emitter resistor 110.

The complementary phase-split outputs on the lines 24 and 26 are produced at the collector and emitter of the transistor 106 and are applied to the frequency modulator 28.

The frequency modulator 28 comprises a multivibrator 112 in the form of two npn transistors 114 and 116 each having a collector load resistor 118, 120, by which the transistors are supplied from the line 54. The base of each of the transistors 114, 116 is connected to the collector of the other via a respective coupling capacitor 122, 124, so that when either of the transistors is conductive, the other is non-conductive. A potential divider comprising a resistor 126 and a zener diode 128 provides a stabilised voltage to which the collectors of the transistors 114 and 116 are connected through diodes 130, 132, so as to limit their voltage swing.

The base of each of the transistors 114 and 116 is supplied from a respective current source comprising a respective transistor 134, 136. Each transistor 134, 136 has a respective emitter load resistor, and its base potential is controlled by a respective biasing resistor 138, 140, the two biasing resistors being connected, through diodes 142, 144, to a point on a potential divider network via an emitter-follower connected transistor 146 and a resistor 148.

The lines 24 and 26 are connected to the bases of the transistors 134 and 136 through respective coupling capacitors 150 and 152.

In operation, the multivibrator 112 will run at a frequency dependent on the current supplied by the transistors 134 and 136. If there were no signal present on the line 24 or on the line 26, the transistors 134 and 136 would supply constant currents to the multivibrator 112 which would therefore run at a fixed frequency. The signals on the lines 24 and 26, however, affect the currents produced by the transistors 134 and 136 and thus alter the frequency of the multivibrator 112 accordingly. Thus, when the signals on lines 24 and 26 are negative-going, the current supplied by the transistors 134 and 136 will increase. The phasing of the signals on lines 24 and 26 is so arranged that the increases of current through transistors 134 and 136 occur during the cut-off periods of transistors 114 and 116 respectively. Thus, as the amplitude of the signals on lines 24 and 26 increases, the frequency of the multivibrator increases without changing its mark-space ratio (positive-going signals on lines 24 and 26 have no effect on transistors 134 and 136 since they are clamped by diodes 142 and 144). The lines 30 and 32 are therefore respectively connected to the collectors of the transistors 114 and 116 and carry complementary output signals whose frequency is dependent on the magnitude of the signals on the lines 24 and 26 and thus on the magnitude of the thermocouple voltage.

The amplifier limiter and squarer circuit 34 comprises a switching transistor 200 whose base is connected to the output line 30 of the frequency modulator. Each positive-going signal on the line 30 switches on the transistor 200, producing an amplitude-limited output across its collector load resistor 202 which is applied via a resistor 204 to the current modulator 36.

The latter comprises an npn transistor 206 connected in series with a load resistor 208 across the two lines of the cable 40 so as to modulate the current in the cable 40 at the frequency of the output signals on the line 30.

In addition, the line 12 is connected to the collector load resistor 202 to feed the amplitude-limited signals to the series FET 70 of the chopper 10.

The amplitude limiter and squarer circuit 34 also includes a second switching transistor 210 whose base is connected to recieve the output signal from the frequency modulator 28 on the line 32. The transistor 210 has a collector load resistor 212 and is switched on by each positive-going signal on the line 32 to produce an amplitude-limited signal across the resistor 212, which signal is applied by means of the line 14 to control the shunt FET 80 of the chopper 10.

Adjustment of the resistor 102 in the amplifying arrangement 18 alters the sensitivity of the circuit arrangement.

It will be seen that a small d.c. voltage, due to the transistor 66, exists at the point 69 even when the thermo-couple 5 is producing no output. This small voltage produces a corresponding modulation on the cable 40. Thus, open-circuiting of the thermocouple 5 will be immediately indicated since the small d.c. voltage at the point 69 due to the transistor 66, and the corresponding modulation on the cable 40, will immediately disappear.

Open-circuiting or short-circuiting of the cable 40 can also be immediately indicated since, under these conditions, there will be no modulation signal at the indicating and alarm unit 42.

Using nickel/chromium versus nickel/aluminum thermocouples, temperatures up to 1,100° C can be monitored. This temperature can be increased by using other thermocouples - for example, tungsten versus tungsten/36 percent Rhenium thermocouples can be used to measure up to 2,500° C.

However, it will be appreciated that the circuit arrangement described can be used to convert other d.c. voltages, besides those from thermocouples, into corresponding frequency signals. The d.c. voltage to be converted would be fed into the circuit arrangement at the point 69 instead of the thermocouple voltage.

What is claimed is:

1. An electrical circuit arrangement responsive to the output voltage of a thermocouple, comprising
- signal converting means connected to receive the thermocouple voltage, .
- gating means for gating the signal converting means with a gating frequency so that the signal converting means converts the thermocouple voltage into an alternating signal whose magnitude is dependent on the amplitude of the thermocouple voltage,
- frequency modulating means connected to receive the alternating signal from the signal converting means to produce an output frequency whose value is dependent on the magnitude of the alternating signal,
- means interconnecting the gating means and the frequency modulating means whereby said gating frequency is derived from and in phase with the output frequency of the output frequency modulating means,
- an electrical power supply circuit for supplying unidirectional electrical power to at least the signal converting means and the frequency modulating means, and
- means responsive to the output frequency from the frequency modulating means for superimposing a frequency modulation on the power supply circuit.

2. An electrical circuit arrangement responsive to the output voltage of a thermocouple, comprising
- signal converting means connected to receive the thermocouple output voltage,
- gating means for gating the signal converting means with a gating frequency so that the signal converting means converts the thermocouple voltage into an alternating signal whose magnitude corresponds to the amplitude of the thermocouple votage,
- frequency modulating means connected to receive the alternating signal from the signal converting means to produce an output frequency whose value is dependent on the magnitude of the alternating signal, and
- means interconnecting the gating means and the frequency modulating means whereby the said gating frequency is derived from and in phase with the output frequency of the output frequency modulating means.

3. An arrangement according to claim 1, including
- a power supply circuit for feeding unidirectional power to the signal converting means and the frequency modulating means, and
- means responsive to the output frequency from the frequency modulating means for superimposing a frequency modulation on the power supply circuit.

4. An electrical circuit arrangement responsive to a unidirectional electrical input signal, comprising
- signal converting means connected to receive the unidirectional input signal and operative when supplied with a gating frequency to convert the input signal into an alternating signal whose frequency is dependent on the gating frequency and whose magnitude is dependent on that of the input signal,
- frequency modulating means connected to receive the alternating signal and operative to produce an output signal whose frequency is dependent on the magnitude of the alternating signal,
- gating means responsive to said output frequency to produce said gating frequency in phase therewith,
- means supplying said gating frequency from the gating means to the signal converting means,
- a power supply circuit for feeding electrical power to at least the signal converting means and the frequency modulating means, and
- means responsive to the output frequency from the frequency modulating means for superimposing a frequency modulation on the power supply circuit.

5. An arrangement according to claim 4, including amplifying means connected to receive the alternating signal from the signal converting means and to amplify it before it is applied to the frequency modulating means.

6. An arrangement according to claim 4, in which the frequency modulating means comprises a multivibrator circuit connected to be responsive to the magnitude of the alternating signal so as to have its frequency determined thereby.

7. An electrical circuit arrangement responsive to a unidirectional electrical input signal, comprising signal converting means connected to receive the unidirectional input signal and operative when supplied with a gating frequency to convert the input signal into an alternating signal whose frequency is dependent on the gating frequency and whose magnitude corresponds with that of the input signal, phase splitting means connected to receive the alternating signal from the signal converting means and operative to produce two complementary signals whose frequency and magnitude are dependent on those of the alternating signal, a multivibrator comprising two electronic switching devices connected to be switched on and off alternately, and means responsive to the two complementary signals and connected to control the electronic switching means whereby the complementary signals respectively vary the off-times of the two electronic switching devices so that the frequency of the multivibrator varies in dependence on the magnitude of the alternating signal but its mark/space ratio does not, gating means responsive to the multivibrator output frequency to produce the said gating frequency in phase therewith, and means supplying the said gating frequency from the gating means to the signal converting means.

8. An arrangement according to claim 7, in which the signal converting means comprises a signal chopping circuit including two electronic switching devices connected to receive and chop the unidirectional input signal, and means responsive to the conductive state of each of the switching devices of the multivibrator for controlling the conductive state of a respective one of the switching devices of the signal chopping circuit.

9. A method of transmitting a unidirectional electrical signal, in which the unidirectional signal is converted to an alternating signal of corresponding amplitude, which is then used to produce a frequency modulation dependent on the alternating signal amplitude, and the frequency modulation is then superimposed on power supply lines, and in which the frequency of the frequency modulation and of the said alternating signal are maintained continuously equal and in phase.

* * * * *